United States Patent [19]

Hartnagel et al.

[11] Patent Number: 5,210,647
[45] Date of Patent: May 11, 1993

[54] FIBER VIEWER

[75] Inventors: Heinz Hartnagel, Leander; Raymond J. Kastens; Charles M. Mansfield, both of Austin, all of Tex.

[73] Assignee: Minnesota Mining and Manufacturing Company, St. Paul, Minn.

[21] Appl. No.: 763,192

[22] Filed: Sep. 20, 1991

[51] Int. Cl.$^5$ ............................................. G02B 7/00
[52] U.S. Cl. .................... 359/802; 359/803; 359/804; 359/808; 359/809; 359/815; 385/75
[58] Field of Search ............... 359/798, 802, 803, 804, 359/808, 809, 815; 385/75, 73, 74

[56] References Cited

U.S. PATENT DOCUMENTS

| | | | |
|---|---|---|---|
| 2,870,674 | 1/1959 | Mize | 350/808 |
| 3,514,180 | 5/1970 | Haefner | 359/804 X |
| 3,902,784 | 9/1975 | Dakss et al. | 350/81 |
| 4,146,301 | 3/1979 | Cherin et al. | 385/75 |
| 4,671,629 | 6/1987 | Doyle | 350/523 |
| 5,052,802 | 10/1991 | Hayes et al. | 359/802 X |

OTHER PUBLICATIONS

Type-51 Mass-Fusion Splicer, Published by Sumitomo Electric having a code indicating printing in 1990.

Primary Examiner—Eugene R. LaRoche
Assistant Examiner—Do Hyun Yoo
Attorney, Agent, or Firm—Gary L. Griswold; Walter N. Kirn; Jack V. Musgrove

[57] ABSTRACT

A viewer for inspecting the condition of an end face of an optical fiber which has been cleaved, while the fiber is still in the cleaving device. The viewer takes the form of a pocket-type microscope having a cylindrical body with an eyepiece at one end and an objective lens at the other end, and an adaptor at the end of the body having the objective lens. The adaptor has a plurality of legs having notches therein forming seats which are specially adapted to be mounted on fiber-supporting pads of the cleaver. The adaptor is removable from the body so that different adaptors may be used for different cleavers. The body fits in a socket of the adaptor which may be disposed at an angle with respect to the legs to allow oblique viewing of the fiber end face while it is still in the cleaver. The viewer may optionally be used with an inspection tray having a trunnion at one end, the adaptor of the viewer being designed to pivotally mount to the trunnion, allowing viewing of the fiber end face at any angle.

19 Claims, 2 Drawing Sheets

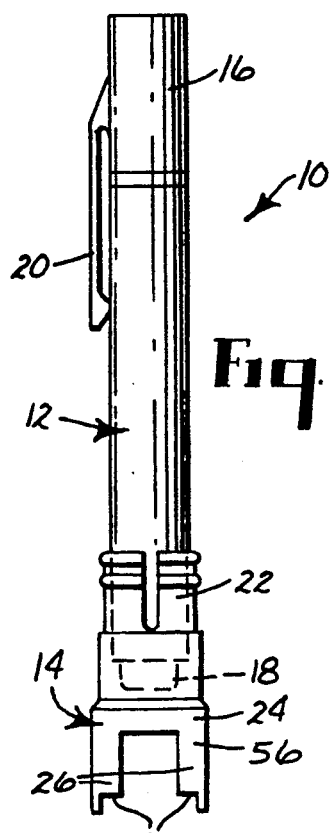
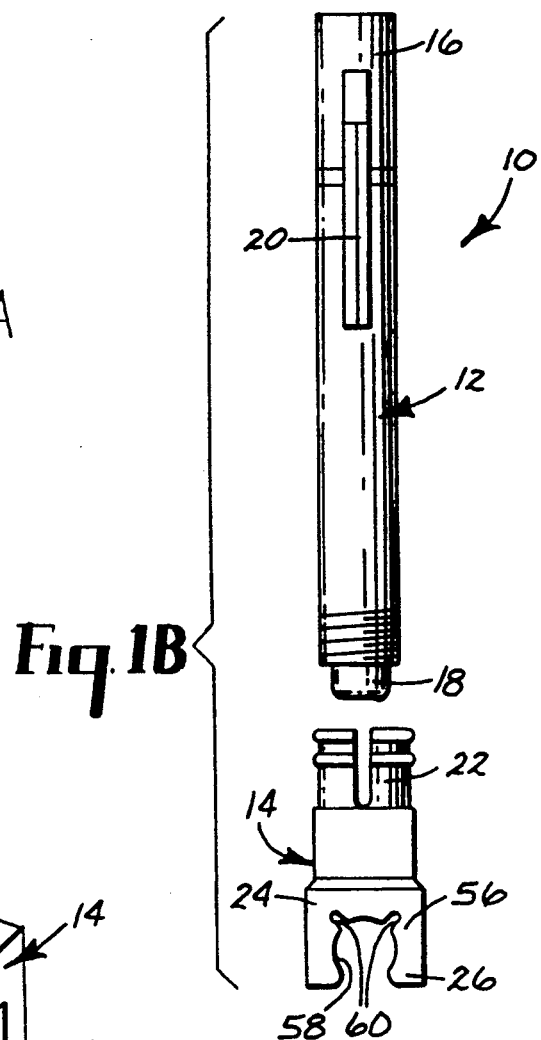
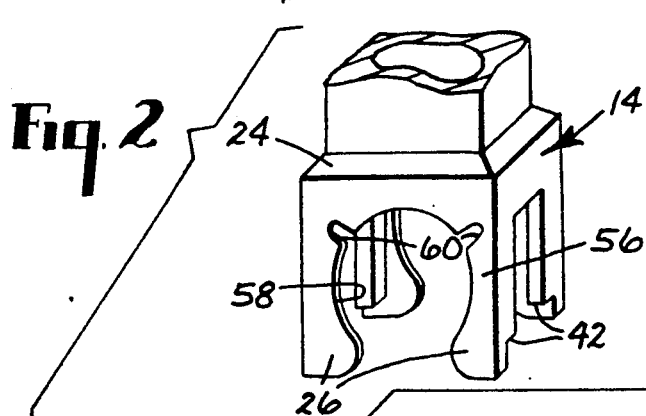
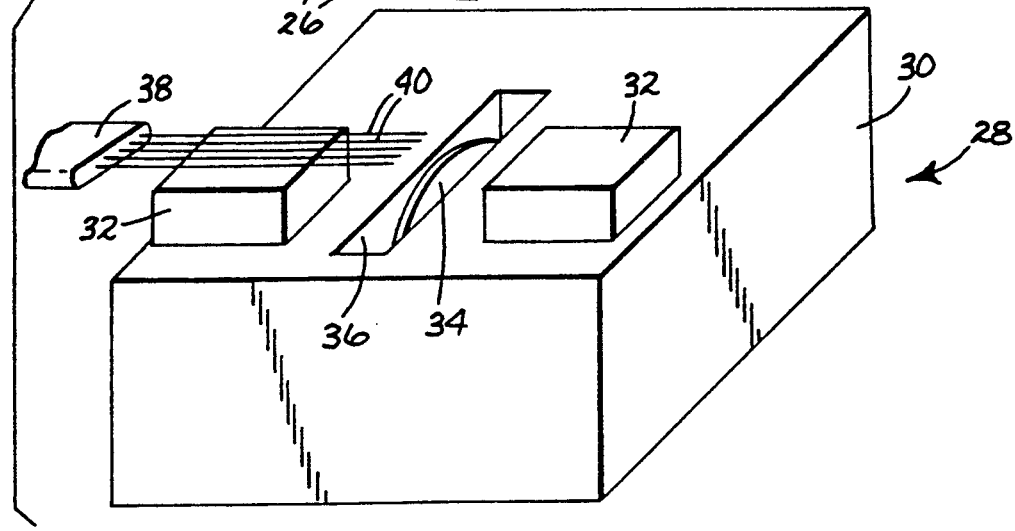

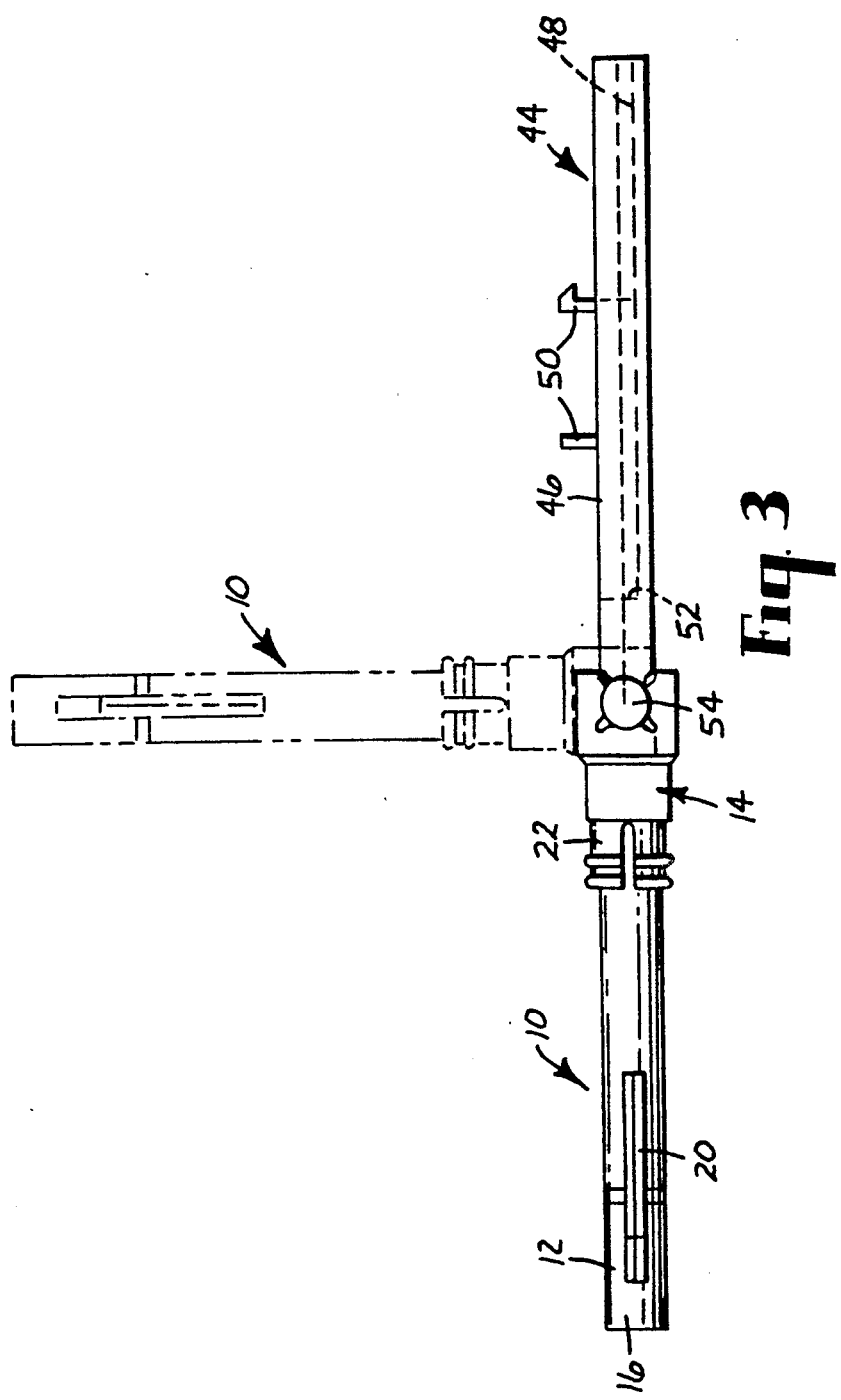

FIBER VIEWER

BACKGROUND OF THE INVENTION

1. Field of the Invention

The present invention generally relates to optical viewing devices, and more particularly to a device which is used to inspect the end faces of cleaved optical fibers.

2. Description of the Prior Art

The use of optical fibers for high speed communication and data transmission via optical signals has become well established. It is often necessary to splice an intermediate portion of optical fiber, due to breakage of the fiber, or to connect a terminal end of a fiber to another fiber in order to reach very distant locations. The condition of the fiber end face is important since irregularities in the surface of the end face may result in higher signal loss across the splice. With some optical connectors, such as biconic and ferrule connectors, the condition of the end faces may be inconsequential, since the end faces are typically (but not always) smoothed in a polishing operation. See, e.g., U.S. Pat. No. 3,902,784 issued to Dakss et al. For mechanical and fusion splices, however, a cleaving operation can often produce a smooth end face without the complicated polishing step. Moreover, it would be more difficult to polish the end faces of fibers which are to be connected via a mechanical or fusion splice, since there is no structure inherent in such splices (like a ferrule) which serves to hold the terminal end of the fiber.

In the cleaving operation, which typically requires special cleaving devices having strict mechanical tolerances, a score line is produced along the outer surface of a fiber, and the fiber is then bent or pulled over a form, causing it to break at the score line. Unfortunately, these devices do not always provide a perfect cleave, i.e., the end faces may possess unacceptable defects such as irregular cracks, lips, or shattered ends, and the operation must be repeated. The operation is further complicated by the fact that the fibers must be removed from the cleaver and placed in another device before the end faces of the fibers can be inspected. For example, U.S. Pat. No. 4,671,629 depicts a device which is used to examine the surface finish of fiber optic ends. This device is rather cumbersome in that it requires access to both ends of the optical fiber. Alternatively, a pocket-type microscope, such as the one sold by FOTEC of Japan under model number V100, may be used to view the fibers. That device includes a light attachment which swivels away from the main microscope body to illuminate the object viewed from an angle, but the microscope uses plastic lenses which have poor optical properties, and is not well-suited for inspecting bare fibers. Finally, expensive interferometers may be used to inspect the end faces. All of the prior art devices, however, still require removal of the fibers from the cleaver prior to inspection. It would, therefore, be desirable and advantageous to devise an instrument for visually inspecting the end face of a cleaved fiber while it is still in the cleaver. In this manner, the cleaved end faces may be checked more quickly.

SUMMARY OF THE INVENTION

The foregoing objective is achieved in a fiber viewer having an elongated body, optical elements (lenses) located within the body, and an adaptor for attaching the body to a cleaving device. In the preferred embodiment, the adaptor is removable from the body to allow use of different adaptors depending on the specific cleaver being used. The adaptors include legs, each having a notch forming a seat which rests on a corner of the fiber-supporting pads located on the cleaver proximate its cutting blade. The adaptor advantageously has circular cutouts on one pair of opposing sidewalls allowing it to snap onto a trunnion of an optional inspection tray. The optical elements of the viewer are movable with respect to the adaptor to allow adjustment of the focal plane, and the optics are selected to give the optimum combination of focal depth, field of view and magnification.

BRIEF DESCRIPTION OF THE DRAWINGS

The novel features and scope of the invention are set forth in the appended claims. The invention itself, however, will best be understood by reference to the accompanying drawings, wherein:

FIG. 1A is a front elevational view of the fiber viewer of the present invention, and FIG. 1B is a side elevational view showing the viewer body removed from the adaptor;

FIG. 2 is an enlarged perspective view depicting the manner in which the adaptor fits onto the fiber-supporting pads of an exemplary cleaving device; and FIG. 3 is a side elevational view illustrating use of the fiber viewer of the present invention with an inspection tray.

DESCRIPTION OF THE PREFERRED EMBODIMENT

With reference now to the figures, and in particular with reference to FIG. 1, there is depicted the fiber viewer 10 of the present invention. Fiber Viewer 10 is generally comprised of a body 12 and an adaptor 14. Body 12 may take various forms, but its physical appearance is preferably similar to prior art pocket-type, hand-held microscopes. Body 12 is thus generally cylindrical, with a diameter of about 2 cm and a length of about 14 cm. Body 12 may be formed from any durable material, such as aluminum.

Body 12 contains conventional optical elements forming a compound microscope. These elements include an eyepiece 16 at an upper end of body 12, and an objective lens 18 at the lower end. The elements are preferably glass lenses having high optical quality. A resilient clip 20 may also be attached to body 12. Adaptor 14 includes a socket portion 22 which is attached to a base 24 having a plurality of legs 26. If a fiber ribbon is to be inspected, the legs should be separated by a distance sufficient to allow passage of the fiber ribbon. The lower end of body 12 is threaded to mate with threads formed on the inner surface of socket 22. In this manner, body 12 may be twisted to adjust the focal plane of the optical system with respect to the location of adaptor 14. Adaptor 14 is also formed of any durable material, preferably one that is transparent, such as acrylic or polycarbonite polymeric resins.

Referring now to FIG. 2, that figure illustrates the use of fiber viewer 10 with an exemplary prior art cleaving device 28. Cleaver 28 includes a base 30 having two fiber-supporting pads 32, and a cutting blade 34 which is movably disposed in a slot 36 located in base 30. Of course, cleaver 28 includes several other elements which are not depicted as they are not relevant to operation of fiber viewer 10. A fiber ribbon 38 is also depicted, which has been Stripped and cleaned to expose a plurality of optical fibers 40 (viewer 10 can, of course, also be used with single, discrete fibers). The position of support pads 32 with respect to cutting blade 34 (i.e., the location of the upper surfaces of the pads with respect to the plane defined by movement of the upper edge of the cutting blade) is strictly set to ensure proper scoring of fibers 40.

After cleaving, viewer 10 is placed on cleaver 30 by lowering adaptor 14 over pads 32. Legs 26 of adaptor 14 have notches 42 forming seats which fit snugly about the edges or corners of pads 32, locating the focal point of viewer 10 proximate the fiber ends. The optical elements in body 72 are selected to provide a focal plane which lies approximately at the plane formed by notches 42. As mentioned above, the focal plane may be slightly adjusted by twisting body 12 with respect to adaptor 14. The magnification of the optical system may vary considerably, from 5X to 1000X. If the fibers are to be inserted in a mechanical splice (as opposed to a fusion splice), then the condition of the end faces is not as critical, and a relatively low power magnification (e.g., in the range of 10X to 50X) is adequate for ascertaining the quality of the cleaved ends. In the preferred embodiment, the magnification is about 25X. The optical elements should also be selected to optimize the field of view and the focal depth of the optical system. Prior art microscopes were inadequate in this regard, since they did not have a wide enough field of view to allow simultaneous inspection of several fibers 40 which are closely spaced. The diameter of the field of view should be at least 0.25 mm, and the focal depth should be at least 0.05 mm. In the preferred embodiment, viewer 10 provides a field of view having a diameter of about 3.8 mm and a focal depth of about 0.12 mm. This allows viewing of a ribbon having as many as twelve fibers.

When viewer 10 is so placed on cleaver 28, it allows inspection of fibers 40 immediately upon cleaving, avoiding the additional laborious step of placing the fiber in special viewing devices and avoiding the need for any such device. Socket 22 may be formed at an angle with respect to legs 26 in order to allow inspection from an oblique perspective, and is preferably formed at an angle of about 20°. Alternatively, socket 22 may be rotatably mounted on adaptor 14, allowing viewing from several different angles while the fibers are still in the cleaver. The axis of rotation of the socket should lie in the focal plane of the optical system (i.e., near the plane formed by notches 42) whereby the fibers will remain essentially in focus as the body is rotated about the adaptor.

An optional inspection tray 44, illustrated in FIG. 3, may further be used to facilitate inspection of the fiber end faces. Such a tray is advantageously used with a fiber holder 46, and has a channel 48 therein for receiving holder 46. Holder 46 may have gripping members 50 to simplify handling of the fibers. A step 52 formed at the forward end of channel 48 prevents holder 46 from moving too far forward. An axle or trunnion 54 is provided at the forwardmost end of tray 44, having a central cutout to allow passage of the fibers. Trunnion 54 is generally perpendicular to channel 48. Base 24 of adaptor 14 has sidewalls 56 formed between opposing leg pairs, the sidewalls having circular cutouts 58 whose effective diameter is approximately equal to the diameter of trunnion 54. The arcuate cutouts are preferably greater than a half-circle (i.e., more than 180°) to ensure that adaptor 14 will snap snugly about trunnion 54.

Breaks 60 along cutouts 58 impart resilience to base 24 and allow legs 26 to flex slightly when adaptor 14 is snapped onto trunnion 54. Fibers 40 should be positioned in holder 46 whereby their ends approximately terminate in the cutout, coinciding with the axis of trunnion 54; alternatively, if holder 46 is used in the cleaving operation, step 52 may be positioned at a known distance from trunnion 54, corresponding to the distance the holder was placed from cutting blade 34 in cleaver 28. In this manner, when viewer 10 pivots on trunnion 54, the fiber ends remain at the focal plane of the optical system of viewer 10. The pivoting action about trunnion 54 is separate from the optional rotatable mounting of socket 22 described above.

A further enhancement to viewer 10 consists of an adaptor which would provide means for holding an individual fiber or a fiber ribbon which is cleaved in a cleaver having no support features which would allow mounting of viewer 10 directly onto the cleaver.

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. For example, a small flashlight (penlight) could be clipped to body 12 to provide direct and proximate illumination of the fibers during the inspection operation. Also, legs 26 may also be designed to mount on features of a cleaver other than fiber-supporting pads. It is therefore contemplated that such modifications can be made without departing from the spirit or scope of the present invention as defined in the appended claims.

We claim:

1. An instrument for visually inspecting the end face of an optical fiber located in a cleaving device, the instrument comprising:
 a generally cylindrical body;
 lens means located in said body for optically magnifying the end face of the optical fiber; and
 adaptor means for attaching said body to the cleaving device, said adaptor means including a socket for receiving one end of said body, and a base attached to said socket, said base having a plurality of leg members for attachment to the cleaving device.

2. The instrument of claim 1 wherein said leg members each have a notch, forming a seat for mounting on fiber support pads of the cleaving device.

3. The instrument of claim 1 wherein said lens means has a focal plane, and further comprising means for adjusting the location of said focal plane with respect to said adaptor means.

4. The instrument of claim 1 wherein said lens means includes an eyepiece and an objective lens.

5. The instrument of claim 1 wherein said lens means provides a field of view having a diameter of at least 0.25 mm.

6. The instrument of claim 1 wherein said lens means provides a field of view having a diameter of about 3.8 mm.

7. The instrument of claim 1 wherein said adaptor means is formed of a transparent material.

8. An optical fiber inspection kit including the instrument of claim 1 and further comprising:
 means for holding the optical fiber;
 an inspection tray having a channel for receiving said holding means, said tray having a trunnion at one end positioned generally perpendicular to said channel, said trunnion having a cutout for passage of the optical fiber, and said adaptor means further having means for rotatably mounting the instrument to said trunnion.

9. The instrument of claim 2 wherein said lens means provides a focal plane approximately coinciding with a plane formed by said notches in said leg members.

10. The instrument of claim 5 wherein said lens means provides a focal depth of at least 0.05 mm.

11. The instrument of claim 6 wherein said lens means provides a focal depth of about 0.12 mm.

12. The instrument of claim 8 wherein said socket is attached to said base of said adaptor means at an oblique angle with respect to said leg members.

13. A fiber viewer comprising:
 a generally cylindrical body having first and second ends;
 a transparent adaptor having a base and a socket, said second end of said body being inserted in said socket, and said base having a plurality of leg members each having a notch forming a seat for mounting said base on fiber support pads of a fiber cleaving device; and
 lens means for optically magnifying the end face of an optical fiber placed in the cleaving device, said lens means including an eyepiece located within said body at said first end thereof, and an objective lens located within said body at said second end thereof, said lens means defining a focal plane which is approximately located at a plane defined by said notches in said leg members.

14. The fiber viewer of claim 13 further comprising means for adjusting the location of said focal plane with respect to said adaptor.

15. The fiber viewer of claim 13 wherein said lens means provides a field of view having a diameter of about 3.8 mm and a focal depth of about 0.12 mm.

16. The fiber viewer of claim 13 wherein said socket is attached to said base of said adaptor at an oblique angle with respect to said leg members.

17. An optical fiber inspection kit including the fiber viewer of claim 13, and further comprising:
 means for holding the optical fiber;
 an inspection tray having a channel for receiving said holding means, said tray having a trunnion at one end positioned generally perpendicular to said channel, said trunnion having a cutout for passage of the optical fiber, and said base of said adaptor further having means for rotatably mounting the fiber viewer to said trunnion.

18. The kit of claim 17 wherein said mounting means comprises two opposing sidewalls formed in said base of said adaptor, each of said sidewalls having an arcuate cutout of more than 180°, said cutouts having an effective diameter which is approximately equal to the diameter of said trunnion.

19. A kit for inspecting the condition of an end face of an optical fiber which has been cleaved by a cleaver having fiber-supporting pads, the kit comprising:
 a generally cylindrical body having first and second ends;
 a transparent adaptor having a base and a socket, said second end of said body being inserted in said socket, and said base having a plurality of leg members each having a notch forming a seat for mounting said base on said pads of said cleaver, said socket being attached to said base at an oblique angle with respect to said leg members;
 lens means for optically magnifying the end face of the optical fiber, said lens means including an eyepiece located within said body at said first end thereof, and an objective lens located within said body at said second end thereof, said lens means defining a focal plane which is approximately located at a plane defined by said notches in said leg members, having a magnification in the range of 10X to 50X, and providing a field of view having a diameter of about 3.8 mm and a focal depth of about 0.12 mm;
 means for adjusting the location of said focal plane with respect to said adaptor;
 means for holding the optical fiber; and
 an inspection tray having a channel for receiving said holding means, said tray having a trunnion at one end positioned generally perpendicular to said channel, said trunnion having a cutout for passage of the optical fiber, and said base of said adaptor further having means for rotatably mounting said adaptor to said trunnion.

* * * * *